Patented Jan. 2, 1934

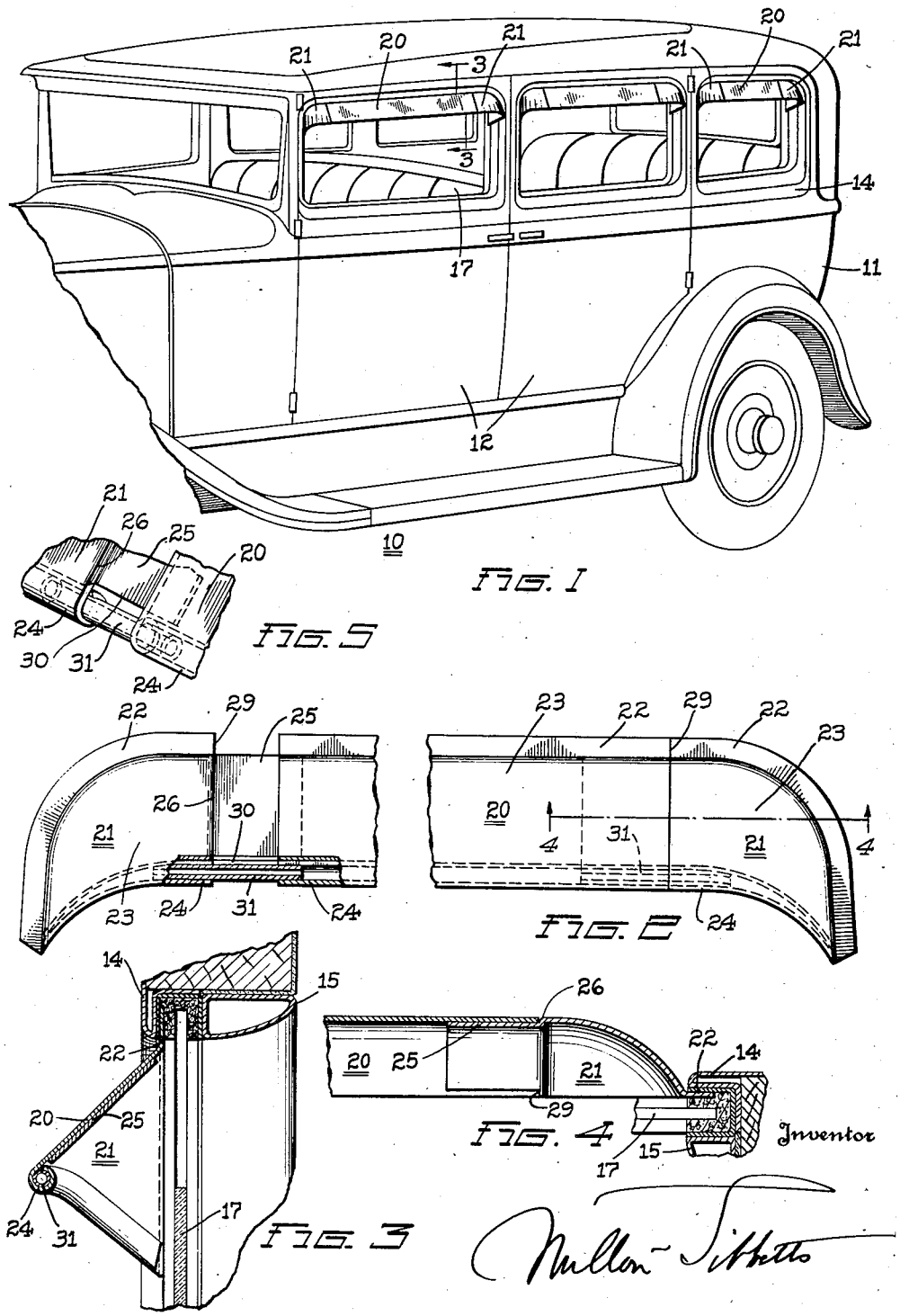

1,942,225

UNITED STATES PATENT OFFICE 1,942,225

MOTOR VEHICLE

Milton Tibbetts, Detroit, Mich., assignor to Packard Motor Car Company, Detroit, Mich., a corporation of Michigan Application November 30, 1931
Serial No. 577,888

7 Claims. (Cl. 296—44)

This invention relates to motor vehicles and more particularly to visors for vehicle windows.

Visors are now generally employed for the windows of motor vehicles to shield the occupants thereof from rain, snow, etc. Various types of visors have been proposed for this use, the most popular of which are the sectional type of visor and the one piece type of visor. Sectional visors are as a rule adjustable and for this feature are preferable, however, an objection to them is that heretofore they have been bulky constructions with overlapping surfaces or having nuts and bolts in evidence so that they give an unsightly appearance to a motor car. The preferable construction of the one piece type of visor is such that it may be sprung into the window frame grooves and frictionally held in position. However, visors of this type are only applicable to windows of a predetermined width and therefore different forms of visors must be provided for windows of different width.

It is an object of the present invention to provide a new and novel window visor of sectional construction having the appearance and all the desirable features of a one piece visor.

Another object of the invention is to provide a visor comprising a plurality of associated sections telescopically connected to form a unitary structure adapted to be sprung into the window grooves and frictionally held in position.

A further object of the invention is to provide a visor comprising a plurality of associated sections having their adjacent ends overlapped in a manner to give an external appearance of an unbroken surface.

A still further object of the invention is to provide an economically manufacturable sectional visor through the use of two standard end sections applicable to all widths of windows which are joined by a central section of suitable length.

These and other objects of the invention will appear from the following description taken in connection with the drawing which forms a part of this specification and in which:

Fig. 1 is a fragmentary perspective view of a motor vehicle body embodying the invention;

Fig. 2 is an enlarged elevational view of the visor, partly broken away and partly in section;

Fig. 3 is a sectional view taken on line 3—3 of Fig. 1;

Fig. 4 is a fragmentary sectional view of the visor and a portion of the window frame taken on line 4—4 of Fig. 2;

Fig. 5 is an enlarged fragmentary perspective view of the visor showing the method of detachably securing the sections relatively.

Referring to the drawing by characters of reference, 10 indicates a motor vehicle having a body 11 and doors 12. In the body and doors are window openings having panels 14 on one side and garnish mouldings 15 on the other side forming a window frame. The panels and mouldings are spaced to provide channels therebetween, the lowermost of which opens through either the door or the body frame. Within the top and side channels are fixed U-shaped felt runways for the windows 17. The windows can be raised and lowered through the bottom channel openings in a conventional manner.

Sectional visors are provided for the windows 17 and each comprises a central section 20 and two similar end sections 21 which are preferably detachably secured with the central section. The sections are preferably formed of flexible sheet metal, and the end sections are preferably stamped of a uniform size and shape which is standard for all types of windows. The sections conform in contour to the upper ends of the window frame and a flange 22 forms an edge portion thereof. As best illustrated in Fig. 3, the sections have shade portions 23 extending outwardly from the flanges 22, the lower edges of such shade portions being preferably rolled as at 24 to effect a finish and for detachably securing the sections relatively, as will be hereinafter more fully described.

The sections are associated in a manner to give the appearance of a one piece visor. To accomplish this effect, the adjacent ends of sections 21 are formed with offset portions 25 adapted to underlie the ends of section 20. The ends of section 20 abut the shoulders 26 formed by the offset portions and due to the overlapping relation present an outer visor surface having a substantially unbroken appearance. The flanges 22 of sections 21 terminate flush with the shoulders 26, as at 29, to avoid overlapping with the corresponding flanges of the section 20, and the rolled edges 24 of sections 21 also terminate flush with the shoulder 26. In terminating the rolled edges of the sections 21, sufficient metal is removed from the lower edge of the offset portions, as indicated at 30, to avoid interference with the rolled edge of section 20 when assembled.

In order to secure the sections together against relative movement, I provide detachable means which in this instance comprise pins 31, adapted to telescopically engage the adjacent rolled edges 24. As shown, these pins are formed as sheet metal tubes and each has one end frictionally or otherwise secured within the rolled edges of one section 21, while the other ends are slidably engageable in and frictionally held in the adjacent rolled edges of section 20. In this manner, a visor is formed of sections which are detachably secured together to form a unitary structure, and which will not collapse lengthwise when in place.

The visor structure herein described is very readily secured to a window frame of a motor vehicle without the aid of screw bolts or other similar attaching means. The overall length of the shade portion can be made equal to the width of the window, being fitted so that the laterally disposed flanges 22 of the end sections will extend into the channel runway. By reason of the flexible material employed, the structure may be longitudinally flexed and the flanges 22 of the end sections positioned between the felt runways and the adjacent wall of the channels. The visor is then allowed to spring back to its normal shape whereby the flanges 22 compress the felt to frictionally secure the visor in position. With the visor in such position, the window glass 19 can be lowered to a point slightly above the rolled edge 24 of the visor, as shown in Fig. 3, so that air may be admitted through an opening shielded from rain, snow, etc.

It will be appreciated that the visor construction described obviates many of the disadvantages inherent in previously known window visors. A visor of this type may be economically manufactured to fit windows of various widths by reason of the standard end sections, and the central section which may be formed of a uniform width of stock and then cut to the required length. Furthermore this unitary visor structure, having the economical and adjustable features of sectional visors, also has an unbroken surface appearance and the desirable feature of being frictionally held in position and also of being sprung into or out of position upon flexing.

Although the invention has been described in connection with a specific embodiment, the principles involved are susceptible of numerous other applications which will readily occur to persons skilled in the art. The invention is therefore to be limited only as indicated by the scope of the appended claims.

What I claim is:

1. A flexible visor structure for the windows of motor vehicles comprising similar end sections having end flanges to fit channel runways, a central section connecting the end sections, the ends of said central section lying in overlapped relation to the adjacent ends of the end sections with the outer surfaces flush, and means for securing the sections together.

2. A flexible visor structure for motor vehicle windows comprising similar end sections having offset portions forming shoulders and having end flanges to fit channel runways, a detachable central section intermediate the end sections, the ends of said central section overlying the offset portions of said end sections and abutting said shoulders when the visor is in place, thus giving an outer appearance of a one piece structure, and means for securing the sections together.

3. A visor structure for the windows of motor vehicles including similar end sections having shade portions extending outward from the top of a window frame and terminating in a rolled edge, a central section overlapping the end sections and having a corresponding shade portion and rolled edge, and telescopic means frictionally engaging the rolled edges of adjacent sections to secure the sections together.

4. A flexible visor structure for the windows of motor vehicles comprising end sections having offset portions forming shoulders, a detachable central section intermediate the end sections, the ends of the central section overlapping the offset portions entirely and abutting the shoulders of said end sections when the visor is in place, thereby forming a substantially continuous outer visor surface, and detachable means securing the overlapping ends of the sections together.

5. A sectional visor for grooved window frames of variable width, comprising two standard end sections having laterally extending flanges around the top and side edge thereof, a detachable central section associated intermediate the end sections and having a lateral flange at the top edge thereof aligning with the adjacent flanges of the end sections, said central section being cut of a length such that the lateral side flanges of the end sections will extend into the said grooves of the window frame with which it is to be associated, the shade portions of adjacent sections overlapping, the one being offset and underlying the other so that a flush appearance is presented with the visor in place, the sections having flexibility sufficient to permit springing the visor in place so that the side flanges of the end sections will enter the frame side grooves.

6. A sectional visor for grooved window frames comprising two similar end sections having flanges adapted to extend into the groove of the window frame, and a central section associated intermediate the end sections and having a flange along one edge thereof adapted to align with adjacent flanges of the end sections and to extend into the groove of the window frame, the shade portions of the end and central sections having overlapping relation, one section being offset and underlying the other section so that a shoulder is formed to retain the visor against longitudinal collapse and to present a smooth outside appearance.

7. A sectional visor for grooved window frames comprising two similar end sections having shade portions and having flanges adapted to extend into the side groove of the window frame, and a central section associated intermediate the end sections and having a shade portion and a flange along the top thereof adapted to extend into the top groove of the window frame, the shade portions of the end and central sections having overlapping relation, one section being offset and underlying the other section so that a shoulder is formed to retain the visor against longitudinal collapse and to present a smooth outside appearance when the visor is in place with its flanges in the window grooves, said shoulder being so positioned with respect to the adjacent section and the width of the window that there is full overlap of the offset part when the visor is in place.

MILTON TIBBETTS.